(12) United States Patent
Phatak et al.

(10) Patent No.: US 12,475,475 B2
(45) Date of Patent: Nov. 18, 2025

(54) METHODS AND APPARATUSES FOR AUTOMATICALLY ESTIMATING ORDER SIZES

(71) Applicant: Walmart Apollo, LLC, Bentonville, AR (US)

(72) Inventors: Abhijeet Rajendra Phatak, Sunnyvale, CA (US); Chittaranjan Tripathy, Sunnyvale, CA (US); Aaron Martin John Sharpe, Shipley (GB); Christopher Grierson, Kellington (GB); Karan Khurana, Foster City, CA (US); Chandrasekar Ramalingam, Cupertino, CA (US); Ioannis Pavlidis, Boulder, CO (US); Rishabh Mudgal, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 129 days.

(21) Appl. No.: 17/906,055

(22) PCT Filed: Jun. 30, 2020

(86) PCT No.: PCT/US2020/040331
§ 371 (c)(1),
(2) Date: Sep. 9, 2022

(87) PCT Pub. No.: WO2022/005459
PCT Pub. Date: Jan. 6, 2022

(65) Prior Publication Data
US 2023/0186332 A1 Jun. 15, 2023

(51) Int. Cl.
*G06Q 30/00* (2023.01)
*G06Q 30/0202* (2023.01)

(52) U.S. Cl.
CPC ............................ *G06Q 30/0202* (2013.01)

(58) Field of Classification Search
None
See application file for complete search history.

(56) References Cited

U.S. PATENT DOCUMENTS 7,035,815 B1 * 4/2006 Henson .................. G06Q 30/06
705/26.7
7,437,305 B1 * 10/2008 Kantarjiev ......... G06Q 30/0201
705/7.29

(Continued)

OTHER PUBLICATIONS

Lee, Sungjoo, Seunghoon Lee, and Yongtae Park. "A prediction model for success of services in e-commerce using decision tree: E-customer's attitude towards online service." Expert Systems with Applications 33.3 (2007): 572-581. (Year: 2007).*

(Continued)

*Primary Examiner* — Gurkanwaljit Singh
(74) *Attorney, Agent, or Firm* — Morgan, Lewis & Bockius LLP; Manita Rawat

(57) ABSTRACT

A customer order prediction system can include a computing device configured to obtain customer order data characterizing a customer's interaction with an electronic marketplace and to obtain environmental data characterizing at least one event expected to effect the customer's ordering behavior. The computing device can be further configured to generate feature data based on the customer data and the environmental data wherein the feature data organizes the customer data and the environmental data based on characteristics of an order size estimation model. The computing device is also configured to determine a predicted customer order size using the order size estimation model and to adjust a delivery availability of the electronic marketplace based on the predicted order size.

20 Claims, 6 Drawing Sheets

(56) References Cited

U.S. PATENT DOCUMENTS

| | | | | |
|---|---|---|---|---|
| 7,693,748 | B1* | 4/2010 | Mesaros | G06Q 30/0207 |
| | | | | 705/26.42 |
| 8,473,425 | B1* | 6/2013 | Maurer | G06Q 10/083 |
| | | | | 705/14.42 |
| 8,494,975 | B2* | 7/2013 | Lee | G06Q 10/083 |
| | | | | 705/332 |
| 10,319,053 | B1* | 6/2019 | Kohli | G06Q 10/0832 |
| 10,579,955 | B1* | 3/2020 | Wier | G06Q 10/0838 |
| 10,754,916 | B1* | 8/2020 | Rehn | G06Q 10/0833 |
| 11,282,126 | B1* | 3/2022 | Hsiao | G06Q 30/0633 |
| 2002/0069082 | A1* | 6/2002 | Choe | G06Q 10/0833 |
| | | | | 705/26.1 |
| 2002/0161674 | A1* | 10/2002 | Scheer | G06Q 10/0631 |
| | | | | 705/28 |
| 2012/0005019 | A1* | 1/2012 | LeBlanc | G06Q 30/0255 |
| | | | | 705/14.53 |
| 2012/0203708 | A1* | 8/2012 | Psota | G06Q 30/02 |
| | | | | 705/347 |
| 2014/0258032 | A1* | 9/2014 | Psota | G06Q 10/08 |
| | | | | 705/26.35 |
| 2015/0073929 | A1* | 3/2015 | Psota | G06Q 30/0201 |
| | | | | 705/26.2 |
| 2015/0332284 | A1* | 11/2015 | Unser | G06Q 30/0201 |
| | | | | 705/7.29 |
| 2015/0356591 | A1 | 12/2015 | Fano et al. | |
| 2017/0323250 | A1* | 11/2017 | Lindbo | G06Q 30/0621 |
| 2018/0096417 | A1* | 4/2018 | Cook | G06N 5/01 |
| 2019/0228375 | A1* | 7/2019 | Laury | G05D 1/0088 |
| 2019/0279281 | A1* | 9/2019 | Kumar | G06Q 30/0631 |
| 2020/0074402 | A1* | 3/2020 | Adato | G06V 20/52 |

OTHER PUBLICATIONS

Hanssens, Dominique M. "Order forecasts, retail sales, and the marketing mix for consumer durables." Journal of Forecasting 17.3-4 (1998): 327-346. (Year: 1998).*

Leventhal, Barry. "An introduction to data mining and other techniques for advanced analytics." Journal of Direct, Data and Digital Marketing Practice 12 (2010): 137-153. (Year: 2010).*

The International Bureau of WIPO, International Preliminary Report on Patentability issued in PCT/US2020/040331, Dec. 13, 2022, 8 pages.

International Search Report and Written Opinion for PCT Application No. PCT/US2020/040331 issued Mar. 29, 2021, 13 pages.

* cited by examiner

METHODS AND APPARATUSES FOR AUTOMATICALLY ESTIMATING ORDER SIZES

This application is a National Stage Application, filed under 35 U.S.C. 371, of International Patent Application No. PCT/US2020/040331, filed on Jun. 30, 2020, the entire contents of which is incorporated herein by reference.

TECHNICAL FIELD

The disclosure relates generally to automatically estimating order sizes and, more specifically, to automatically estimating order sizes in ecommerce environments.

BACKGROUND

At least some ecommerce marketplaces can include delivery services that allow a customer to select a delivery time window for the delivery of products or services that can be purchased on the ecommerce marketplace. In some examples, the ecommerce marketplace is implemented by a retailer website. The retailer website can allow a customer to search, browse and select products for purchase. After a customer selects products for purchase, the retailer website can allow the customer to choose one or more delivery time windows during which time the ordered products (or services) can be delivered to the customer's delivery destination.

Customers can be permitted to amend, add or delete products after an initial order is placed on the ecommerce marketplace. Customers can often amend the order at times just before or close in time to the selected delivery time window. Such last minute changes can present challenges for retailers or other ecommerce marketplace operators because the delivery vehicle or vehicle fleet may not have enough capacity to provide all the products in the amended order to the customer during the delivery time window. In addition, if too much capacity is reserved in the delivery vehicles to account for the possibility of customers' last minute changes, the delivery vehicles can be under-utilized. In either circumstance, the retailer or other ecommerce marketplace operator can operate with higher costs, can miss potential sales and/or can suffer from decreased customer satisfaction. Therefore, there exists a need for improved apparatuses and methods to predict the final size of customer orders to decrease costs, increase sales and improve customer satisfaction.

SUMMARY

The embodiments described herein are directed to a customer order prediction system and related methods. The customer order prediction system can be implemented using one or more computing devices that can include operative elements that can connect customers to an ecommerce marketplace. The ecommerce marketplace can allow a customer to place an order for goods or services and select a delivery time window for delivery of the ordered products. The ecommerce marketplace can further allow the customer to revise and/or modify the customer order at times prior to a cut-off time for the selected delivery window. During such periods prior to the cut-off time, the customer order prediction system can obtain various types of data such as customer order data and environmental data. The customer order prediction system can organize and/or structure the data according to the characteristics of an order size estimation model. The structured data can then be used by the order size estimation model to determine a predicted customer order size. The predicted customer order size can then be used to determine whether delivery capacity exists based on the predicted customer sizes. If excess capacity is available, the customer order prediction system can adjust the availability of delivery during the delivery time window and display or otherwise communicate the adjusted delivery availability to the customer via the ecommerce marketplace. The order size, in some embodiments, can be defined as the weight, volume or the number of grocery totes (or combination thereof) that are needed to transport the ordered goods.

In accordance with various embodiments, exemplary systems may be implemented in any suitable hardware or hardware and software, such as in any suitable computing device. For example, in some embodiments, a computing device is configured to obtain customer order data characterizing a customer's interaction with an electronic marketplace and to obtain environmental data characterizing at least one event expected to effect the customer's ordering behavior. The computing device can be further configured to generate feature data based on the customer data and the environmental data wherein the feature data organizes the customer data and the environmental data based on characteristics of an order size estimation model. The computing device is also configured to determine a predicted customer order size using the order size estimation model and to adjust a delivery availability of the electronic marketplace based on the predicted order size.

In some embodiments, a method is provided that includes obtaining customer order data characterizing a customer's interaction with an electronic marketplace and obtaining environmental data characterizing at least one event expected to effect the customer's ordering behavior. The method can further include generating feature data based on the customer data and the environmental data wherein the feature data organizes the customer data and the environmental data based on characteristics of an order size estimation model. The method can also include determining a predicted customer order size using the order size estimation model and adjusting a delivery availability of the electronic marketplace based on the predicted order size. Such predictions and adjustment of delivery availability can be performed dynamically and in an automated manner.

In yet other embodiments, a non-transitory computer readable medium has instructions stored thereon, where the instructions, when executed by at least one processor, cause a computing device to perform operations that include obtaining customer order data characterizing a customer's interaction with an electronic marketplace and obtaining environmental data characterizing at least one event expected to effect the customer's ordering behavior. The non-transitory computer readable medium can include further instructions that, when executed by the at least one processor, cause the computing device to generate feature data based on the customer data and the environmental data wherein the feature data organizes the customer data and the environmental data based on characteristics of an order size estimation model. The non-transitory computer readable medium can also include instructions that, when executed by the at least one processor, cause the computing device to determine a predicted customer order size using the order size estimation model and adjust a delivery availability of the electronic marketplace based on the predicted order size.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
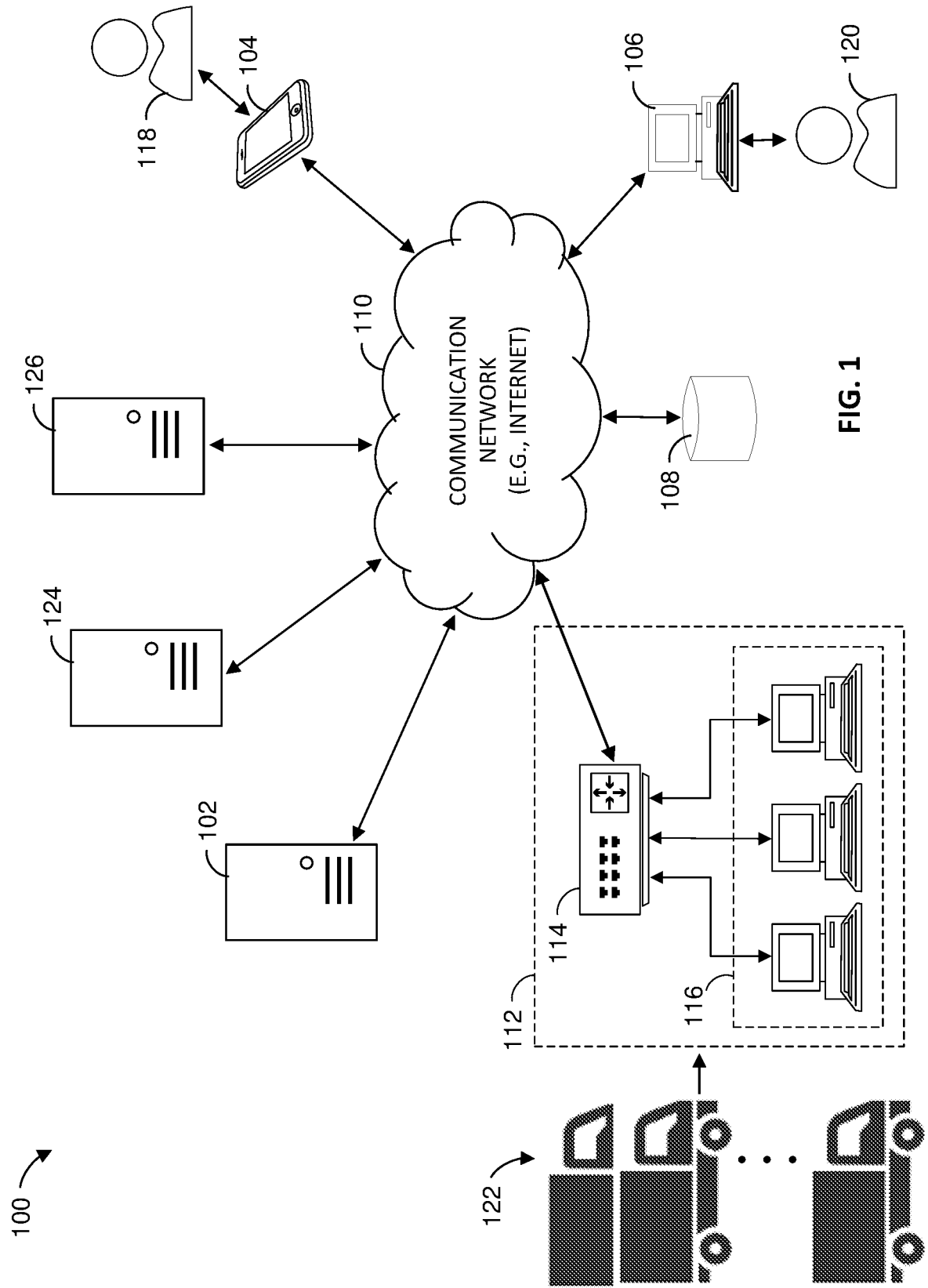
FIG. 1 is a block diagram of a customer order prediction system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In some electronic marketplaces, customers can order goods or services and then select a time window in which the goods are delivered or the services are provided at the customer's preferred location. One type of electronic marketplace that can offer this type of service is an online grocery retailer and this example implementation is described below. It should be appreciated, however, that the teachings and principles of the present disclosure can also be applied to other types of electronic marketplaces. Such other types of electronic marketplaces can include other types of online retailers that may offer delivery of ordered goods. In yet other electronic marketplaces, service providers (e.g., maintenance, repair, and installation services providers) may allow ordering or selection of services in an electronic or online environment.

In the example implementation of an online grocery retailer, the retailer may host or offer an electronic marketplace such as a website. The retailer's website can permit a customer to browse, search and select products to be delivered to the customer's home or other delivery destination. The customer may be permitted to select a time window during which time the customer desires the ordered products to be delivered. For example, the retailer may allow the customer to choose one of several two-hour windows for the delivery of ordered products during a selected day. In other examples, the time windows can have other durations such as thirty minutes, one hour, three hours, four hours or other suitable time window durations.

Prior to the selected time window, the retailer can open a particular date for deliveries. When the retailer opens a particular date, the date is available for a customer to schedule a delivery. When a date is made available to customers, the customer can schedule the delivery and then add products, delete products or modify the products in the customer's virtual cart. Many of these websites allow the customer to continue to add, delete or modify the products in the customer's virtual cart until a cut-off time at which the customer's order is finalized for delivery. The retailer may set the cut-off time at any suitable time period prior to the scheduled delivery time. In some examples, the retailer may set the cut-off time at midnight the day before the scheduled delivery. In other examples, the retailer may set the cut-off time at six hours before the scheduled delivery. In still other examples, the retailer may set the cut-off time at other time periods before the scheduled delivery such as thirty minutes, one hour, four hours, twelve hours, eighteen hours, one day or the like.

After the cut-off time has passed, the retailer can use a suitable methodology to automatically prepare a delivery plan that can allocate the customers' orders for a particular delivery time into an optimized delivery route for each vehicle used to transport the products in the order from the retailer's location (e.g., store, warehouse, logistic center, factory, etc.) to the customer's designated delivery location (e.g., home, business, warehouse, office, storage facility, etc.). The retailer also can allocate each customer order to a delivery vehicle in a retailer's fleet of delivery vehicles. The allocation of the orders can be based on the capacity of each vehicle in the retailer's fleet. Each vehicle, for example, may have different capacities for different types of goods. A first vehicle may only have capacity to deliver dry goods or goods that can be transported at room (ambient) temperature. A second vehicle may have capacity to deliver refrigerated goods. A third vehicle may have capacity to deliver room temperature, refrigerated and frozen goods. A fourth vehicle may have capacity to deliver oversized products. This example fleet that includes the first vehicle, second vehicle, third vehicle and fourth vehicle can be used to transport various products having different storage and delivery characteristics. The retailer can allocate the customers' orders for a given delivery time according to the characteristics of the products in the customers' orders and the capacity of the vehicles in the retailer's fleet.

The allocation of the customers' orders into the delivery fleet can be made to minimize the resources required to deliver the products in the customers' orders. For example, the allocation can minimize the amount of miles that are driven by the delivery fleet or the allocation can minimize the amount of fuel expended to deliver the products. In still other examples, the allocation can minimize the amount of time that it takes to deliver the products. In yet other examples, the allocation can minimize the cost to the retailer in delivering the products in the customers' orders. Such a minimization of cost can account for various measures, including two or more of the measures described above. As can be appreciated, it can be advantageous to minimize the cost to the retailer by minimizing the amount of fuel, the amount of miles driven, the amount of man-hours expended or various other measures to increase the profitability of the retailer.

Any suitable methodology can be used to allocate the customer orders to the retailer's delivery fleet. Various automated methodologies or algorithms can be used to optimize the allocation of orders and to create an optimized routing for the deliveries of the customers' orders. This type of automated optimization is a Capacitated Vehicle Routing Problem with Time Windows (CVRPTW) for which various mathematical models are available or have been previously created. One of the inputs for such models, algorithms or solvers is the size of the customer's order in terms of weight, volume and type of product (i.e., chilled, frozen, ambient). The volume of the products in the customer order can be measured by defining a number of totes that are required for the delivery. A tote can be a predetermined container that is used to hold and move the products in a customer order from the retailer's location to the delivery location. For example, a tote can be a box, bag, or other suitable storage container. The tote's can be, for example loaded with goods from a customer's order and then placed into the vehicles of the retailer's vehicle fleet for delivery to customers. In other examples, the products in the customer order can be defined using other measurements such as, weight, volume or tote count or some combination thereof.

The retailer's total capacity in its delivery fleet is known. In the example described above, the retailer's fleet can be quantified in terms of the number of available totes and the total volume and total weight constraints, and can be further quantified in terms of the type of available environment (i.e., chilled, frozen, ambient). Therefore, at any particular time, the retailer can know the utilization of its delivery fleet for a particular delivery time based on the number of totes that are required to hold the products in the customers' orders as compared to the total capacity of its delivery fleet. This comparison can be made for individual vehicles to determine a utilization of particular vehicles in the delivery fleet. Since customers often change their orders by adding products, deleting products, and/or modifying quantities of products after making a reservation for a particular delivery time window but prior to the cut-off time for the delivery, the final utilization of the retailer's vehicle fleet can be different from the utilization that can be determined at times prior to the cut-off time for the delivery.

As can be appreciated, it is desirable to maximize the utilization of the retailer's fleet at the cut-off time. It can also be desirable to keep an accurate record of the utilization at times prior to the cut-off time to allow customers to order more goods. It is undesirable, however, to allow a customer to add products to his or her order and then not have the capacity to deliver such products to the customer at the designated delivery time. Therefore, there is a need for improved methods and apparatuses to determine and predict a final customer order size at the cut-off time in order to provide such information to customers to allow customers access to excess capacity at times prior to the cut-off time. In the context of ecommerce and/or electronic marketplaces it can be desirable to provide such information to customers in real time because customers want to have immediate feedback regarding the availability of delivery time slots of products in real time.

Existing or traditional methods and apparatuses suffer from a variety of drawbacks. Existing methods and apparatuses include assumptions and parameters that require actively changing such parameters to account for external or environmental factors. In some existing methods, external or environmental factors are not even considered. In addition, existing methods can include computations or determinations that cannot be made in realtime. Still further, existing systems are poor at predicting final order sizes of customers. The methods and apparatuses of the present disclosure can be scaled to be applied in multiple applications and to provide realtime updated predictions of a customer's order size. As a result, customers have increased satisfaction and the utilization of retailer's delivery fleets is increased over existing methods. Furthermore, accurate prediction of customers' order sizes gives the retailer the estimation of the free space in the fleet of delivery vehicles much before the cutoff time. Therefore, more delivery time slots can be opened to accept more orders from customers, thereby increasing the revenue to the retailer in addition to often serving a larger customer base than is possible using existing or traditional methods and apparatuses.

The methods and apparatuses of the present disclosure leverage algorithms from machine learning and artificial intelligence coupled with historical transactional data and data available from other retailer online tools (e.g., recommender engines). In addition, the predictions can be further enhanced by utilizing external sources of data regarding external or environmental events that may have an effect on customers' order sizes. The predictions using the methods and apparatuses of the present disclosure can further measure the performance of the prediction tools by determining and comparing Key Performance Indicators (KPI) such as vehicle fleet utilization, slot availability, customer satisfaction, revenue, cost, or the like. These KPI's can drive the re-training of the prediction tools automatically to improve their performance.

Turning to the drawings, FIG. 1 illustrates a block diagram of a customer order prediction system 100 that includes a predictor computing device 102 (e.g., a server, such as an application server), a central ordering computing device 124, an external information source 126 (e.g., a web server), a retailer order management system 112, a database 108, and multiple customer computing devices 104, 106 operatively coupled over network 110. Predictor computing device 102, central ordering computing device 124, external information source 126, retailer order management system 112, and multiple customer computing devices 104, 106 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 110.

In some examples, predictor computing device 102 can be a computer, a workstation, a laptop, a server such as a cloud-based server, or any other suitable device. In some examples, each of multiple customer computing devices 104, 106 can be a cellular phone, a smart phone, a tablet, a personal assistant device, a voice assistant device, a digital assistant, a laptop, a computer, or any other suitable device. In some examples, predictor computing device 102 is operated by a retailer, and multiple customer computing devices 104, 106 are operated by customers of the retailer.

The retailer order management system 112 can include one or more workstations 116 that can be coupled to a server, communication network or router 114. The retailer order management system 112 can, for example, be located at a store, warehouse or other retailer location. The store or warehouse can be operated by the retailer and can be a location at which customer order information is received from the central ordering computing device 124. The customer order information can include, for example, the final order information for customers' orders. The final order information can include the products, quantities and delivery information for the customers' orders. This information can be conveyed and used to deliver the customer orders using one or more vehicles 122 in the retailer's delivery fleet.

Predictor computing device 102 can also be operable to communicate with database 108 over the communication network 110. The database 108 can be a remote storage device, such as a cloud-based server, a memory device on another application server, a networked computer, or any other suitable remote storage. Although shown remote to predictor computing device 102, in some examples, database 108 can be a local storage device, such as a hard drive, a non-volatile memory, or a USB stick.

Communication network 110 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 110 can provide access to, for example, the Internet.

The customer computing devices 104, 106 may communicate with the central ordering computing device 124 over communication network 110. For example, the central ordering computing device 124 may host one or more websites. Each of the customer computing devices 104, 106 may be operable to view, access and interact with the websites hosted by the central ordering computing device 124. In some examples, the central ordering computing device 124 can allow a customer 118, 120, via the customer computing devices 104, 106, to browse, search and/or select products for purchase. The central ordering computing device 124 can also allow the customer to select a delivery window for the delivery of the ordered items. The central ordering computing device 124 may also permit the customer to add, delete or revise the ordered items at a time period prior to a cut-off time before the selected delivery window.

Figure 2:
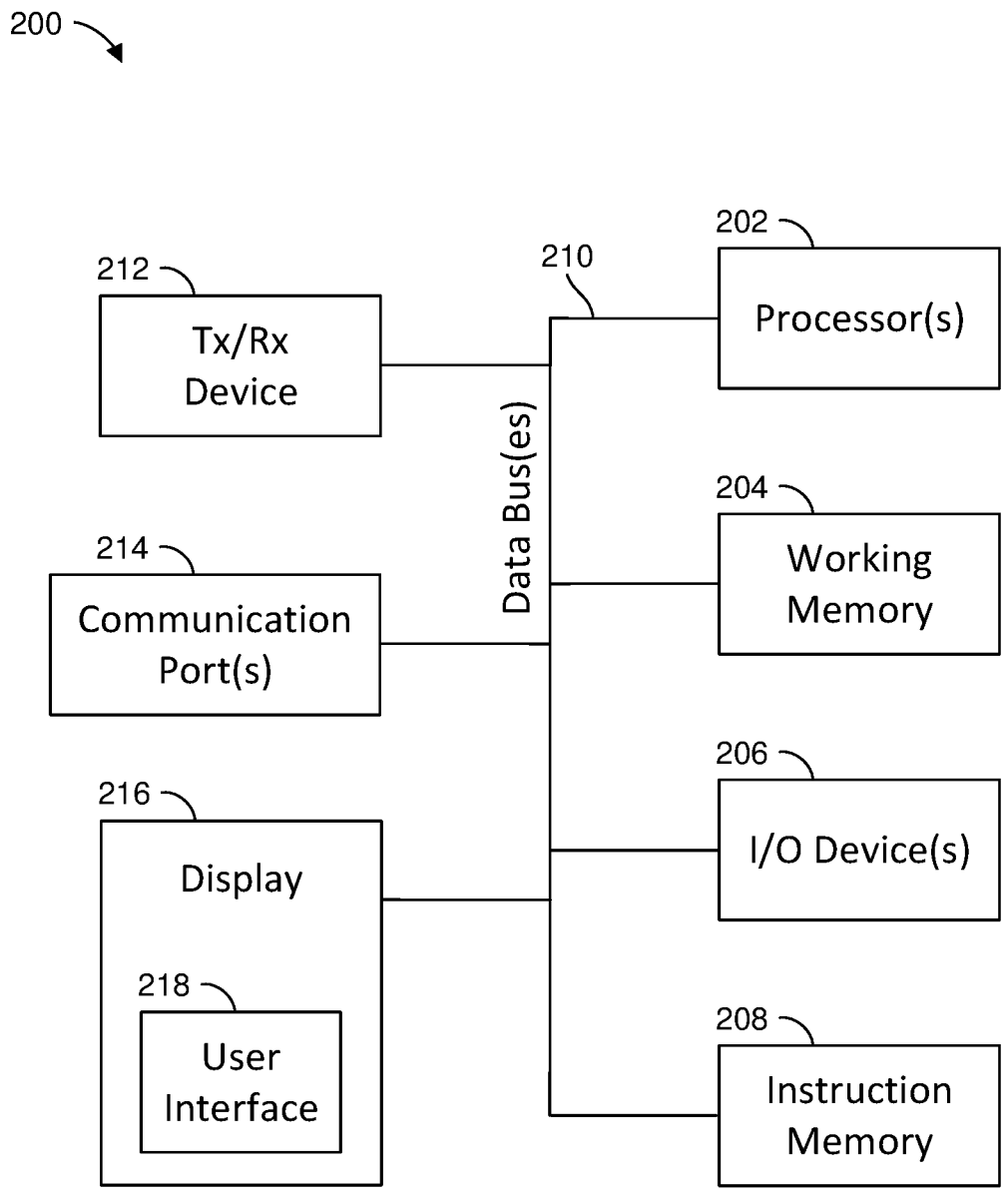
FIG. 2 is a block diagram of a predictor computing device of the customer order prediction system of FIG. 1 in accordance with some embodiments.

FIG. 2 illustrates an example computing device 200. The predictor computing device 102, the retailer order management system 112, the central ordering computing device 124, the external information source 126, and/or the customer computing devices 104, 106 may include the features shown in FIG. 2. For the sake of brevity, FIG. 2 is described relative to the predictor computing device 102. It should be appreciated, however, that the elements described can be included, as applicable, in the retailer order management system 112, the central ordering computing device 124, the external information source 126, and/or the customer computing devices 104, 106.

As shown, the predictor computing device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the predictor computing device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as customer order data, historical transaction data, environmental data and other types of data described herein.

Display 216 can display a user interface 218. User interfaces 218 can enable user interaction with the predictor computing device 102. For example, user interface 218 can be a user interface that allows an operator to interact, communicate, control and/or modify different features or parameters of the predictor computing device 102. The user interface 218 can, for example, display the predicted order sizes of customers or the performance of the predictor computing device 102 using different textual, graphical or other types of graphs, tables or the like. In some examples, a user can interact with user interface 218 by engaging input-output devices 206. In some examples, display 216 can be a touchscreen, where user interface 218 is displayed on the touchscreen.

Transceiver 212 allows for communication with a network, such as the communication network 110 of FIG. 1. For example, if communication network 110 of FIG. 1 is a cellular network, transceiver 212 is configured to allow communications with the cellular network. In some examples, transceiver 212 is selected based on the type of communication network 110 smart substitution computing device 102 will be operating in. Processor(s) 202 is operable to receive data from, or send data to, a network, such as communication network 110 of FIG. 1, via transceiver 212.

Figure 3:
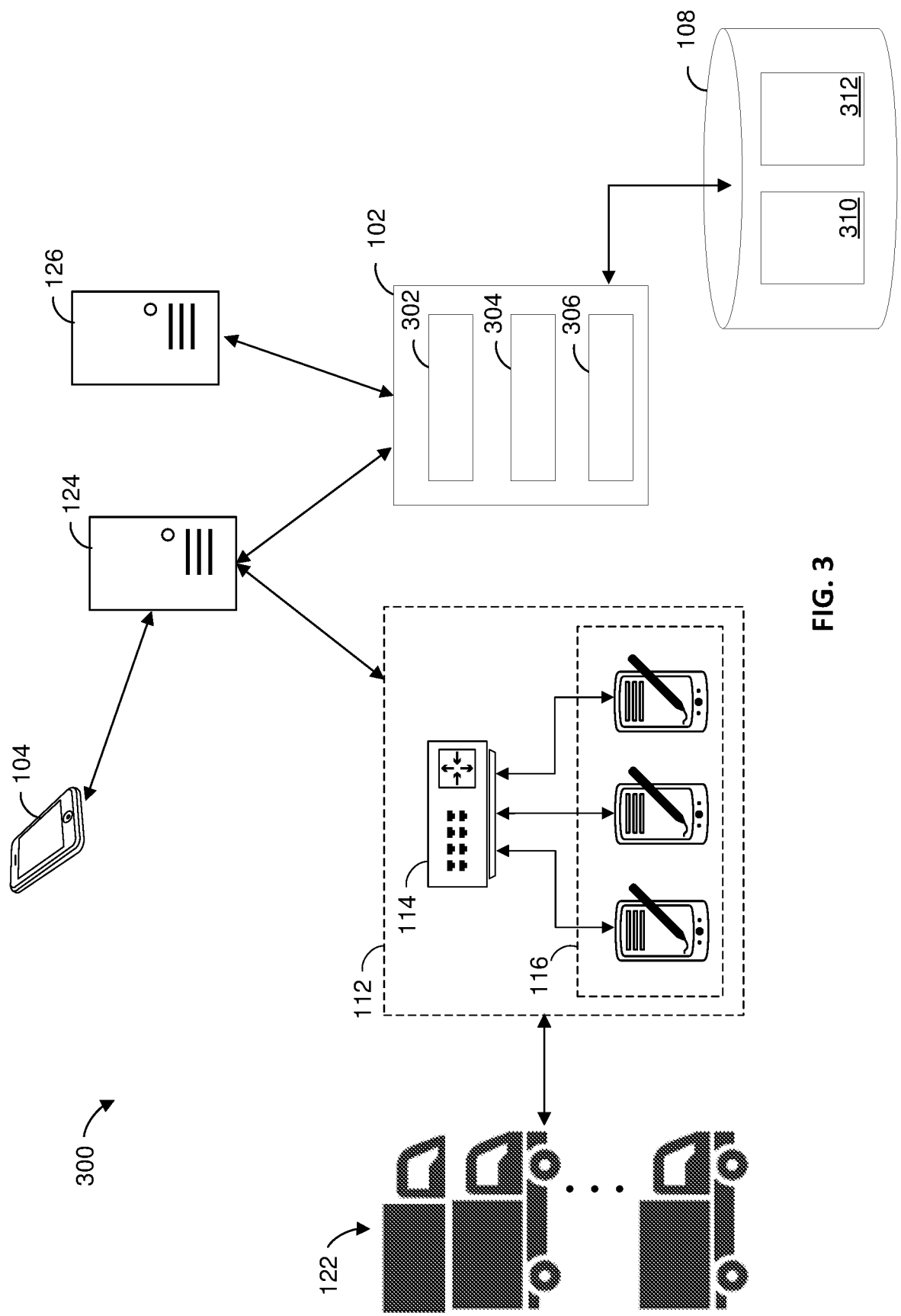
FIG. 3 is a block diagram illustrating examples of various portions of the customer order prediction system of FIG. 1 in accordance with some embodiments.

Turning now to FIG. 3, further aspects of the customer order prediction system 100 are shown. In this example 300, the elements described below are shown in communication with each other. It should be appreciated, however, that while not shown, the elements in example 300 can be in communication with each other over a communication network (e.g., communication network 110). The predictor computing device 102 can be in communication with the central ordering computing device 124, the external information source 126 and the database 108. A customer can access content in the retailer's ecommerce marketplace (i.e., a website) hosted on the central ordering computing device 124 by using his or her mobile computing device 104. In other examples, the customer may use a desktop customer computing device 106 or any other suitable computing device. The customer can browse, search, select or otherwise interact with the ecommerce marketplace. The ecommerce marketplace may allow the customer to select a delivery window. The ecommerce marketplace provided by the central ordering computing device 124 can automatically update and display the availability of delivery time windows upon receiving customer order prediction data from the predictor computing device 102. The predictor computing device 102 can include a customer order prediction engine 302 that determines and can send the customer order prediction data to the central ordering computing device 124.

In some embodiments, the customer order prediction engine 302 can, for example, use or be implemented as an instance of one or several statistical machine learning models such as time-series regression, regression trees, random forest, boosted trees and their variants, deep convolutional and recurrent neural networks in order to predict the order size and weight of the order, and further use optimization techniques such as linear programming and mixed integer programming that uses the predicted size and weight of the order along with the order content to determine the optimal number totes from the available tote types (ambient, chilled and frozen), needed for the customer order while the customer herself or himself is grouped into one of the clusters determined automatically using K-means clustering, mean shift clustering, Gaussian mixture models and the like or by customer's engagement type such as whether the customer is new or dormant or actively engaged with the retailer, the geography and the spending profile of the customer.

The predictor computing device 102 can also include a data collection engine 304. The data collection engine 304 can collect, extract, or otherwise obtain data that can be used to train the customer order prediction engine 302, update the customer order prediction engine 302 and/or determine predictions of customer order size. The data collection engine 304 can for example, retrieve, scrape or otherwise collect data from the external information source 126 and/or from the database 108.

The external information source 126 as will be further described, can be any suitable data source that may include information that can have an effect on the purchasing behavior of a customer. The external information source 126 can, for example, be a website or other data source that includes information about the weather of the local community in which the customer is located. The weather may have an effect on a customer's purchasing behavior. If the weather is projected to be bad (e.g., storms, blizzard, hurricane, extreme cold, extreme heat, etc.) a customer may be inclined to order additional products in order to allow the customer to stay indoors for a prolonged period. In other examples, the external information source 126 can be a sports website or data source. If a local sports team or other significant sporting event is taking place, a customer may be inclined to purchase additional products for a tailgate, party or other social gathering to accompany the sports event. In yet another example, the external information source 126 can be a data source that includes information about the local news, holidays, seasonality effects, local events, geospatial information, demographic data or the like. Any of these data sources may be of interest and may affect a customer's purchasing behaviors. While only one external information source 126 is shown in FIG. 3, the predictor computing device 102 can be in communication with and obtain data from multiple external information sources 126.

The data collection engine 304 can use any suitable methodology to collect, scrape, access or otherwise obtain the external data from the external information source 126. In some examples, the data collection engine 304 can use a suitable application programming interface (API) to obtain the external data. In other examples, the data collection engine 304 can scrape or extract data from websites using known methodologies. In still other examples, the external data can be pushed from the external information sources 126 to the data collection engine 304. In yet other examples, Internet-of-Things (IoT) devices can directly add items into a customer's cart or into the customer's order based on the usage threshold.

The data collection engine 304 can also retrieve, collect and/or otherwise obtain data from the database 108. The database 108 can be any suitable database as previously described and can include data that is collected and stored by the retailer. The database 108 can include customer data 310 and capacity data 312. The customer data 310 can include various types of information that the retailer has collected historically or otherwise about the customer. The customer data 310 can include, for example, past purchases, past browsing data, past delivery data including but not limited to the order content, volume, weight, tote types used, tote counts for each type of totes such as those for the frozen, chilled and ambient chambers of a delivery vehicle, profile information, delivery destinations, delivery time windows, customer preferences, customer feedback, customer payment information and the like. The customer data 310 can be stored from the customer's past behavior and interaction with the retailer's ecommerce marketplace.

The capacity data 312 can be information that characterizes or otherwise describes the ability of the vehicle fleet of the retailer to deliver the customer orders. The capacity data 312 can include various types of information including the number of vehicles, the type of vehicles, the size of the vehicles, the number of totes that each vehicle can hold, the type of totes that the vehicle can hold (e.g., ambient, chilled, frozen), the range of each vehicle, and the like. The capacity data 312 can be used to determine the utilization and/or availability of the retailer's fleet. As can be appreciated, the capacity data 312 can depend on the nature of the products being delivered.

Referring back to FIG. 3, the predictor computing device 102 can also include an analytics engine 306. The analytics engine 306 can measure the performance of the predictor computing device 102 in making predictions of the customer order sizes. The Key Performance Indicators (KPI) can be used to measure the performance of the predictor computing device 102. The analytics engine 306 can determine, for example, vehicle or fleet utilization, slot availability, increase/decrease in customer satisfaction, revenue, and the like. The KPI's can then be used to determine if changes to the predictor computing device 102 are necessary or whether a recent change, modification or re-training of the predictor computing device 102 is an improvement over a previous version.

The predictor computing device 102 can provide customer order prediction data to the central ordering computing device 124. The central ordering computing device 124 can then, in turn, provide or otherwise display delivery slot availability to the customers that may be browsing or searching the retailer's ecommerce marketplace. The predictor computing device 102 can provide updated and/or continuous customer order prediction data so that the delivery slot availability can be continuously provided to the mobile customer computing device 104. The delivery availability can be provided continuously or on a periodically updated basis at times prior to the cut-off time for the delivery window that has been selected by the customer.

When the cut-off time has occurred, the ability for the customer to update, modify or change his or her customer order is suspended. After the cut-off time, the final information for the customers' orders can be delivered to the retailer order management system 112. The final information can be used by the central ordering computing device and/or the retailer order management system 112 to determine the optimized inventory and delivery route information for each vehicle 122 in the retailer's vehicle fleet for a particular store or warehouse location. In some examples, the optimized inventory and delivery route information can be delivered to one or more delivery tablets (or other mobile computing devices) 116 that can be used by retailer associates to pack each customer order and/or by delivery drivers for use in delivering the customer orders.

Figure 4:
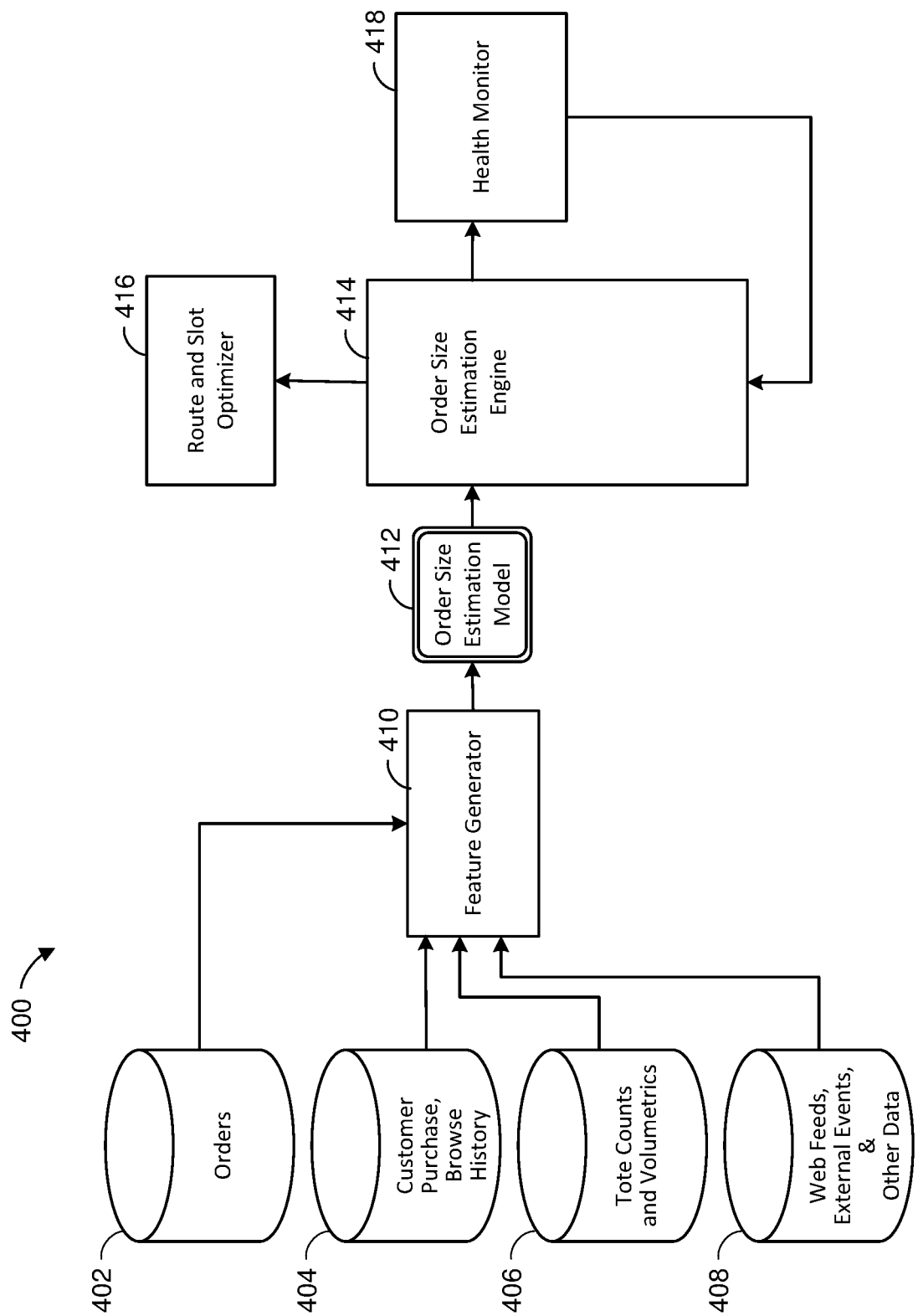
FIG. 4 is a block diagram illustrating examples of various portions of another customer order prediction system in accordance with some embodiments.

Turning now to FIG. 4, one example customer order prediction system 400 is shown. In this example, the relationship between various elements is shown. As can be appreciated, the customer order prediction system 400 can be configured to have similar elements and similar modes of communication as previously described with respect to customer order prediction system 100 and/or the predictor computing device 102. In this example, the customer order prediction system 400 can include a predictor computing device 102. The predictor computing device 102, in this example, can include a feature generator 410, an order size estimation model 412 and an order size estimation engine 414.

The feature generator 410 can include or implemented by any suitable data aggregation and transformation methods that can organize, aggregate, parse or otherwise create data sets that can be used by the order size estimation model 412 during training or during operation of the order size estimation model 412. In one example, the order size estimation model 412 can use a time series regression model to determine predictions of customers' order sizes. In this type of implementation, the feature generator 410 can create datasets from various sources of data described in 402, 404, 406 and 408, for use by the order size estimation model 412. For instance, in one case the feature generator 410 uses previous order sizes and the time intervals between orders to generate the stationarity (i.e., the time series component that does not change over a period of time such as year-over-year although within a year it may change such as the order size in January and February versus those in November and December months), trend components (i.e., any upward or downward drift over time such as from payday to payday), and higher-order features (e.g., the number of time-lagged order sizes, higher-order differences between successive order sizes and higher-order moving averages) that represent the features of time series regression such as those used in autoregressive integrated moving average (ARIMA) model.

The feature generator 410 can include or implemented by any suitable model, methodology as previously described. In some examples, statistical machine learning and artificial intelligence models such as neural networks, autoencoders, clustering techniques, outlier detection methods or the like can be used. A combination of these techniques along with the data transformation, outlier removal, winsorization, imputation and aggregation techniques can be used to create structured feature data that can be used by the order size estimation model 412.

As shown in FIG. 4, the feature generator 410 can be coupled to and be in communication with an orders database 402, a customer purchase and browse history database 404, a tote count and volumetrics database 406, and a web feed and external events database 408. In other examples, the feature generator 410 can be in communication with various other databases that may include or provide information that is of interest to predicting customer order sizes. The orders database 402, the customer purchase and browse history database 404 and the tote count and volumetrics database 406 can be databases such as database 108 previously described. The web feed and external events database 408 can be an external website or external data server such as external information source 126.

The orders database 402 can include information regarding a customer's order that may be currently awaiting delivery. The information may include identifying information regarding the customer and delivery location. The information in the orders database 402 may also include information regarding the pending order of the customer, including products in the order, quantities and the like. The orders database 402 may also include information regarding how the customer order has changed over time. For example, the orders database 402 can include information about the order (i.e., products, quantities, etc.) when the order was initially placed and any subsequent changes, deletions, additions or the like that may have occurred after the order was initially placed. The customer purchase and browse history database 404 can include historical information and other information about a customer. The information, for example, may include a customer's previous orders, previous changes to orders, a customer's search history on the ecommerce marketplace, a customer's browsing history on the ecommerce marketplace and the like.

The tote counts and volumetrics database 406 can include information regarding the capacity of retailers' vehicles as well as information regarding the requirements for each product that may be offered on the retailer's ecommerce marketplace. The tote counts and volumetrics database 406 can include, for example, the size and temperature requirements of a specific product. Information regarding a box of cereal, for example, can be that the box of cereal occupies 5% of a tote, 10% of the weight allowed for the tote and can be transported at ambient temperature. Information in the tote counts and volumetrics database 406 for a frozen turkey, for example, can be that the frozen turkey occupies 30% of a tote, 60% of the allowed weight for the tote and needs to be transported at a frozen temperature. In other examples, the tote counts and volumetrics database 406 can include other types and other suitable information.

The web feeds and external events database 408 can include information about external factors, events, conditions, locations or other information that may have an effect on customers purchasing behaviors. The web feeds and external events database 408 can include any of the types of information or be from the same types of external sources as that described above with respect to the external information source 126. Example types of information that may be included in the web feeds and external events database 408 are weather, event, community, geolocation, sports, news, holiday, local convention, or other information. The web feeds and external events database 408 can be a website, database, server or other device that can be a source of the previously described information.

The feature generator 410 can access, retrieve, scrape or otherwise obtain the information from the orders database 402, the customer purchase and browse history database 404, the tote count and volumetrics database 406 and the web feeds and external events database 408. The feature generator 410 can organize the data into suitable data sets that can be used by the time series regression model of the order size estimation model 412. For example, the feature generator 410 can organize the data into datasets that correspond to discrete time periods prior to the cut-off time for a delivery window. Such time periods may each be a day in advance of the cut-off time before the delivery window. Any of the data previously described that may be contained or located in the orders database 402, the customer purchase and browse history database 404, the tote count and volumetrics database 406 and the web feeds and external events database 408.

The feature generator 410 can create such datasets and each different type of data can be called a feature. A feature is category of data that can have an effect on a customer's purchasing behavior. Thus, each feature can be an input to the time series regression model that is implemented by the order size estimation model 412. The feature generator 410 can automatically, in some instances, determine a feature by employing clustering or other machine learning methodologies to determine which items of data should be grouped together. Example machine learning methodologies can include K-means clustering, mean shift clustering, Gaussian mixture models and the like.

In other examples, the feature generator 410 can make use of a predetermined taxonomy to group data together from the databases when creating the datasets to be used by the order size estimation model 412. For example, the retailer may employ a predetermined taxonomy in the categorization or organization of its products on its ecommerce website. In the example of a grocery retailer, the products can be grouped into different food or product categories. The feature generator 410 may group products from the same food category into a single feature. For example, different features may be fruits, vegetables, dairy products, baked goods, meats, pre-packaged frozen meals, and the like. Thus, the feature generator 410 can create a feature for dairy products and then include data for milk, cheese, yogurt, and butter into this feature for purposes of training the order size estimation model 412 or during operation of the order size estimation model 412 in determining a predicted order size.

Figure 3A:
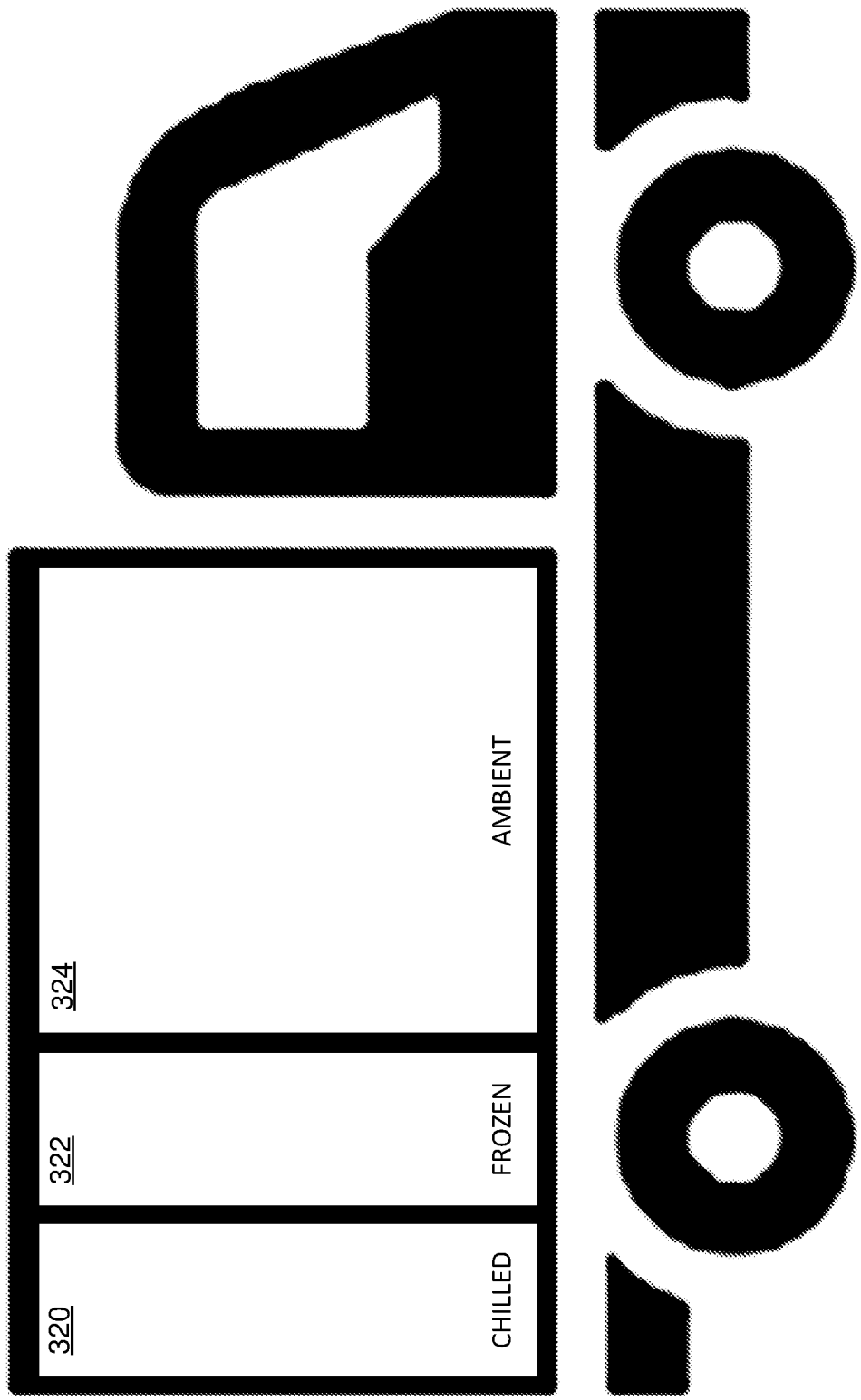
FIG. 3A is an illustration of an example delivery vehicle that can be used to deliver customer orders in accordance with some embodiments.

The feature generator 410 can also organize and/or categorize products using characteristics of the storability of the products in a delivery vehicle. One feature that can characterize the product is whether the product is transported at ambient temperature, chilled temperature or frozen temperature. This can be an important characteristic or feature because each delivery vehicle 122 can include different chambers in which the temperature can be controlled during the transport of the products during delivery. As shown in the example of FIG. 3A, the delivery vehicle 122 can include a chilled chamber 320, a frozen chamber 322 and an ambient chamber 324. The products and/or the delivery totes into which such products can be transported can be deposited into the appropriate chamber 320, 322, 324 during the delivery of the customer order to the customer. The storability characteristic of the products is therefore a consideration that the feature generator 410 can use when organizing and/or categorizing the products. In some example, the feature generator 410 can use two parts of the storability of the products. The first part is the temperature at which the product is to be stored (e.g., chilled, frozen or ambient) and the second part can be the number of totes in a customer's historical orders that belong to each of three temperature categories. In other examples, other architectures or other aspects of a delivery vehicle 122 can be used by the feature generator 410 that may have an effect on the storage or transportation of the products in a customer's order.

The feature generator 410 may also hash or cluster customers into different groups. Since the data that is available for any particular customer is not extensive enough to develop accurate models or predictions based solely on the individual purchasing behavior for each particular customer, customers can be clustered into groups that have similar purchasing behaviors. The customers can be clustered using the automated clustering techniques described above or can grouped into cohorts having predetermined characteristics. For example, customers can be grouped into one of three groups of dormant, new or active customers. A dormant customer can be a customer that has historically placed more than five orders but has not completed an order in the last six months. A new customer can be a customer that has placed an order in the last six months but has not yet completed more than five orders. An active customer can be a customer that has placed an order in the last six months and has completed more than five orders. These conditions for the previously described groups of customers can be different from that explained above and can include more or less characteristics than that previously described. In other examples, demographic information, location information, the annual spending of a customer with the retailer, or other types of information can be used to group customers.

After the feature generator 410 has generated the datasets as described above, the feature data (i.e., the generated datasets for each feature) can be used to train the order size estimation model and/or determine predicted order sizes of customers. During the training of the order size estimation model 412, the feature data can be fed into one or more machine learning, artificial intelligence or other algorithms to identify the relationships between the features and the resulting effect on the customer order. In one example as previously described, the feature data can be used to generate a time series regression model to predict a predicted final customer order size based on the feature data at various time periods prior to the cut-off time.

In other examples, the order size estimation model 412 can employ other machine learning techniques, artificial intelligence or other algorithms. Other examples can include using loss functions such as L2 norm between the predicted and actual values of the customer's order. Another example implementation can use concepts of reinforcement learning to design custom loss functions. In one such implementation, predicting the customer's next order size can be posed as a decision making problem in two ways to maximize a reward (e.g., vehicle capacity utilization) or minimization of regret (e.g., identifying excess capacity prior to cut-off time when no such capacity exists at the cut-off time that can lead to customer dissatisfaction). In still other examples, neural networks can be used. Further, the examples described above with respect to customer order prediction engine 302 can be used.

The order size estimation model 412 can operate to determine a predicted final customer order size at any time after a customer has placed an order prior to the cut-off time for the customer's selected delivery window. The predicted final customer order size is an estimation of the size of the customer's order at the cut-off time. The order size estimation model 412 can be trained using historical data that can be obtained from the customer purchase and browse history database 404 and the web feeds and external event database 408 and/or any other data source or database as described herein. The trained order size estimation model 412 can then be deployed to estimate a customer's order size at various times prior to the cut-off time for the customer's selected delivery window.

For example, the order size estimation model 412 can obtain customer order data from the orders database 402. Such information can be an initial order that is selected by the customer. The customer can also choose a preferred delivery time window. The order size estimation model 412 can then, using the methodologies described above, determine a predicted final customer order size that can be an estimated order size of the customer at the cut-off time. As can be appreciated and as previously discussed, the customer may add, delete, or modify the quantity or selection of products in the order prior to the cut-off time.

Upon determining the estimated products and quantities in the customer's order, the order size estimation model 412 can determine a predicted final customer order size that can be quantified in terms of the number of totes and the type of such totes (i.e., ambient, chilled, frozen) by using data obtained from the tote counts and volumetrics database 406. The predicted final customer order size can be delivered from the order size estimation model 412 to the order size estimation engine 414. The order size estimation engine 414 can operate to deliver the predicted final customer order size to the ecommerce marketplace in order to update the availability of delivery capacity at times prior to the cut-off time for the customer's selected delivery time window. This delivery capacity can be communicated to the customer in order to permit the customer to add products to his or her order. The delivery capacity can also be communicated to other customers that may be using the ecommerce marketplace to place new orders. As can be appreciated, it is desirable to provide an accurate delivery capacity to customers so that customers can place new orders and so that customers can increase the size of existing orders. Thus, the order size estimation engine 414 can be continuously or periodically providing updated information of delivery capacity based on the predicted final customer order sizes that are determined by the order size estimation model 412.

The order size estimation engine 414 can also be in communication with the route and slot optimizer 416. The route and slot optimizer 416 can use information regarding the number of totes and the delivery locations to determine optimized routing information for the retailer's delivery fleet to delivery the customers' orders during delivery time windows. The order size estimation engine 414 can be in communication with the route and slot optimizer 416 in order to provide customized delivery capacity for particular delivery locations. For example, if a delivery vehicle is already committed to deliver a customer's order to a particular delivery location, there may be limited other locations that are available for delivery during the same delivery time window. If a customer provides a requested delivery location that is too remote from the location(s) already committed during a delivery time window, the order size estimation engine 414 can provide delivery capacity information that such delivery time window may not be available.

The order size estimation engine 414 can also be in communication with the health monitor 418. The health monitor 418 can operate similarly to the analytics engine 306. The health monitor 418 can operate to determine Key Performance Indicators (KPIs) such as vehicle utilization, slot availability, customer satisfaction, revenue, cost, etc. The health monitor 418 can be used to assess the performance of the customer order prediction system 400. In addition, the order size estimation model 412 can be revised, retrained or updated in an attempt to improve its performance. The health monitor 418 can compare the performance of the customer order prediction system 400 by comparing the KPIs both before and after a change, retraining or update to the order size estimation model 412. Action can then be taken either to accept the change, retraining or update or to reject.

In another example, the order size estimation engine 414 can include features or methodologies to allow the customer order prediction system 400 to be further flexible and operate in realtime to provide revised and/or updated predictions of the final customer order sizes. In such an example, the order size estimation engine 414 can determine a predicted customer order size based on a weighted average of both the current order size of the customer (i.e., the actual products and quantities in a customer's virtual cart) and the predicted customer order size that is determined by the order size estimation model 412. In such an example, the predicted customer order size can be determined using Equation 1 below:

$$P_{COS} = W_1 * A_{COS} + W_2 * P_{COS(model)} \qquad \text{Equation 1:}$$

where: $P_{COS}$ is the Predicted Customer Order Size
$W_1$ is weight 1
$W_2$ is weight 2
$A_{COS}$ is the Actual Customer Order Size
$P_{COS(model)}$ is the Model's Predicted Customer Order Size The weight 1 and the weight 2 can be determined using any suitable methodology. In the example described above, the weight 1 and the weight 2 are two parameters that when added together add to 1. The weights can be changed in accordance with the proximity in time to the cut-off time for the delivery window. Weight 1 can increase (and consequently the contribution of the Actual Customer Order Size can increase) as the proximity to the cut-off time decreases. Thus, as time passes and the cut-off time draws closer, the reliance of the Predicted Customer Order Size on the Model's Predicted Customer Order Size decreases. For example, at a time three weeks away from the cut-off time for a delivery window, weight 1 can be 0.1 and weight 2 can be 0.9. Thus, the Predicted Customer Order Size relies heavily (90%) on the Model's Predicted Customer Order Size. In contrast, at a time thirty minutes away from the cut-off time, weight 1 can be 0.9 and weight 2 can be 0.1. Thus, the Predicted Customer Order Size relies heavily (90%) on the Actual Customer Size. The weights, weight 1 and weight 2, can be automatically adjusted and determined using any suitable methodology such as statistical machine learning from historical customer order data.

Figure 5:
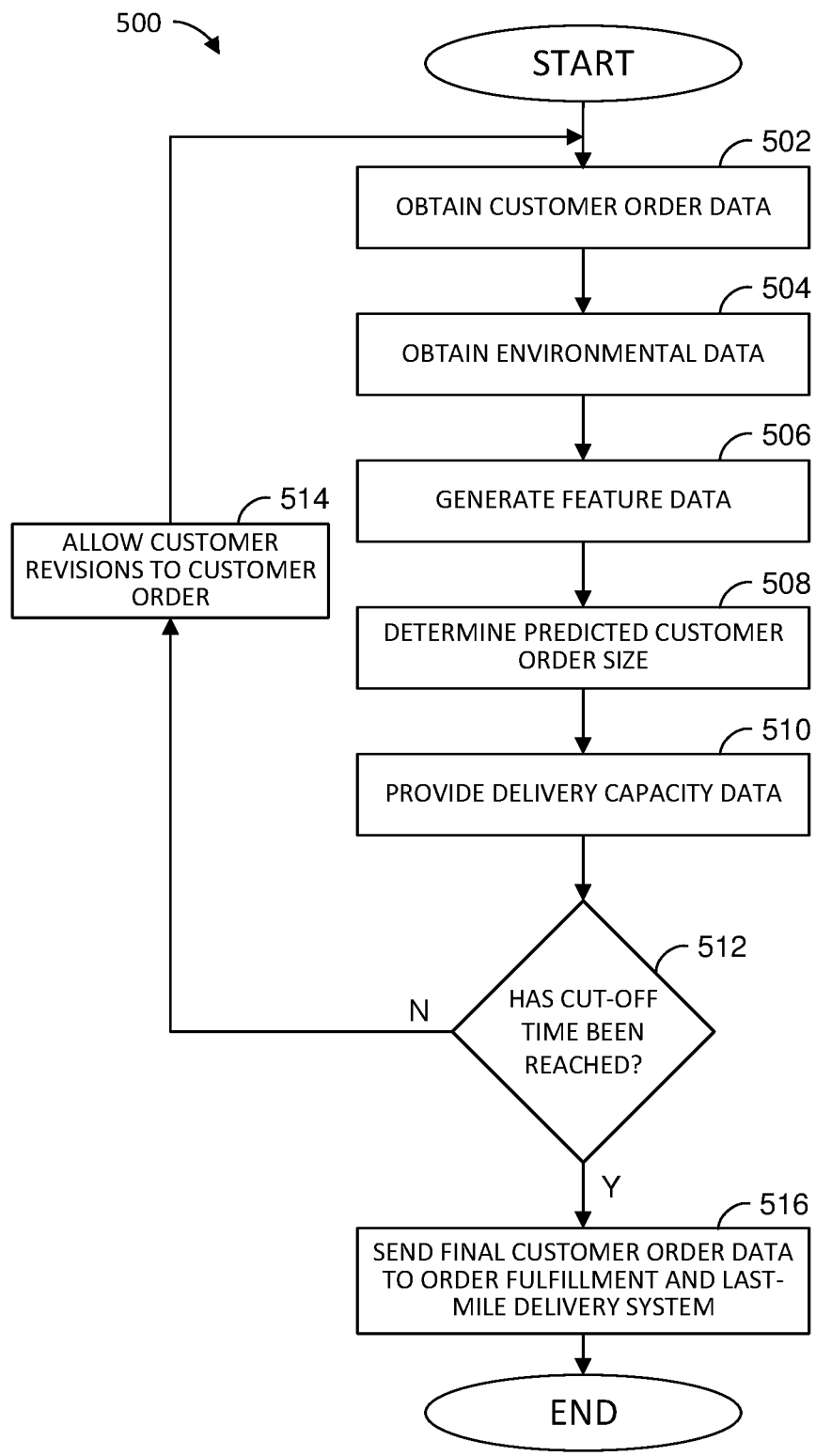
FIG. 5 is a flowchart of an example method that can be performed by the customer order prediction systems of the present disclosure in accordance with some embodiments.

Turning now to FIG. 5, a method 500 of predicting customer order size is shown. The method can be performed, for example, by the customer order prediction system 100, 400. By way of example, the method 500 is described in the context of customer order prediction system 100. It should be appreciated, however, that the method 500 can also be performed by the customer order prediction system 400 or variations thereof using the principles and teachings of the present disclosure. At step 502, customer order data is obtained. For example, the predictor computing device 102 can obtain customer order data from the database 108 or from the central ordering computing device 124. The customer order data can be the data that characterizes a customer's interaction with the retailer's ecommerce marketplace. The customer order data, for example, can be an order for products that also selects a delivery window for delivery of the products to the customer's preferred delivery location. The customer order data can also include information that can identify or characterize characteristics of the customer such as purchase history, previous interactions with the ecommerce marketplace, personal preferences, payment information and the like. The customer can provide customer order data, for example, through the mobile customer computing device 104.

At step 504, environmental data is obtained. For example, the predictor computing device 102 can obtain environmental data from the database 108 or from the external information source 126. The environmental data (or external data), as previously described, can be data that describes or includes information concerning events or other external factors that may influence a customer's purchasing behavior. Such environmental data can include, for example, information concerning local events, weather, news, geospatial information, demographic data, sporting information, travel information and the like. As previously described, the predictor computing device 102 can obtain the environmental data (or external data) from any suitable source such as the external information source 126, the database 108 or the web feeds and external events database 408. The environmental data can be obtained using any suitable technique such as be being retrieved by the predictor computing device 102, pushed to the predictor computing device 102 and/or scraped from the data source by the predictor computing device 102.

At step 506, the feature data is generated. For example, the predictor computing device 102 and/or the feature generator 410 can generate the feature data based on the customer order data and/or the environmental data using the methodologies previously described. The customers can be clustered into predetermined groups of customers having similar purchasing behaviors as previously described. In one example, the customers can be clustered into groups such as active customers, dormant customers and new customers. In addition, the predictor computing device 102 and/or the feature generator 410 can organize product data into categories of data based on a predetermined taxonomy of the products that are offered by the ecommerce marketplace. The predictor computing device 102 and/or the feature generator 410 can further organize and/or structure the customer order data and/or the environmental data to correspond with the structure of the customer order prediction engine 302 and/or the order size estimation model 412. In the example in which the customer order prediction engine 302 and/or the order size estimation model 412 is implemented as a time series regression model. The customer order data and/or the environmental data can be structured as needed to correspond with the appropriate time intervals of the time series regression model. In other examples, the customer order data and/or the environmental data can be structured in other ways to correspond with different implementations of the customer order prediction engine 302 and/or the order size estimation model 412.

At step 508, the predicted customer order size is determined. For example, the feature data and other necessary data can be used by the customer order prediction engine 302 and/or the order size estimation model 412 to determine the predicted customer order size. The predicted customer order size can then be used. In other examples, the predicted customer order size can be weighed against current actual customer order size, such as, by using Equation 1 described above.

At step 510, the delivery capacity data can be determined and provided to the customer. For example, the predictor computing device 102 or the order size estimation engine 414 can access information regarding the capacity of the retailer's vehicle fleet and determine the utilization of the vehicle fleet and/or any remaining capacity that may be available for a given delivery window. This information can be communicated back to the customer so that the customer can add products to his or her order if the delivery capacity data indicates that there is capacity available during the delivery window. The predictor computing device 102 can, for example, provide such delivery capacity data to the central ordering computing device 124 that can, in turn, provide such information to a customer's mobile computing device 104.

The delivery capacity data can be used in various ways. If the delivery capacity data, for example, indicates that excess capacity is available. The predictor computing device 102 and/or the central ordering computing device 124 can adjust delivery availability information that is communicated to customers via the ecommerce marketplace. The excess capacity can allow delivery time windows to be opened for new customers or can allow a customer to add products to an existing order for delivery during such delivery time window. If the delivery capacity data, for example, indicates that no excess capacity is available, previous available delivery time windows can be closed or a customer can be informed that additional products added to an existing order may need to be delivered during an alternate time window where delivery availability may exist. The delivery capacity data can be used to adjust delivery availability in any suitable manner to prevent customers from either being allowed to order products for a delivery time window when delivery capacity is not available and from being prevented from adding products for delivery during a delivery time window when delivery capacity is available.

At step 512, the predictor computing device 102 can determine whether the cut-off time for the delivery window has been reached. As previously described, the cut-off time a delivery window can be set at any suitable time period prior to the delivery window to allow the retailer to fulfill the customer's orders and load the delivery vehicle. The fulfillment of the customer order can include steps such as picking the products listed in the order at a fulfillment center, warehouse or retail store, processing the transaction, and activating the executing the downstream last-mile logistics and delivery system. If the cut-off time has not been reached, the method 500 proceeds to step 514. If the cut-off time has been reached, the method 500 proceeds to step 516. At step 516, the final customer order data can be sent to the order fulfillment and last-mile delivery system which may be located at a retailer's processing location (e.g., warehouse, store, fulfillment center). At or after the cut-off time, the retailer does not permit any further changes to the customer order and the final customer order data can be sent to the processing location (i.e., the retailer's store, warehouse or staging facility). For example, the predictor computing device 102 and/or the central ordering computing device 124 can send the final customer order data to the retailer order management system 112. The final customer order data can include the identifying information for the customer, the customer's ordered products and quantities, the delivery destination and the delivery time window.

As stated above, if the cut-off time has not been reached, the method 500 proceeds from step 512 to step 514. At step 514, the retailer can permit the customer to modify, add, delete or otherwise amend the customer's order. The customer order prediction system 100, 400 can repeat steps 502 through 512 to determine further predictions of the customer's order size at time periods prior to the cut-off time for the customer's selected delivery time window. As can be appreciated, the customer order prediction system 100, 400 can provide such updated predicted customer order size data continuously in realtime. In other examples, the predicted customer order sizes can be determined on a periodic or semi-continuous basis.

The foregoing apparatuses and methods of predicting customer order sizes have significant advantages over known methodologies. The advantages of the apparatuses and methods of the present disclosure include an increased slot availability and improved slot and order conversion. In existing systems, capacity in retailer's vehicles are often reserved using heuristics or assumptions rather than on actual customer purchasing behavior and/or environmental conditions. The apparatuses and methods of the present disclosure can predict customer order sizes more accurately to allow excess capacity to be made available for customers and to increase the utilization of retailer's vehicle fleets. Another advantage is improved slot promise adherence. Since the apparatuses and methods of the present disclosure are better able to predict customer order sizes, the likelihood that a delivery time window will be offered to a customer but not fulfilled is decreased. As such, customer satisfaction improves as well as the likelihood that the customer will be a repeat customer. Still another advantage of the apparatuses and methods of the present disclosure lies in the improvements in vehicle fleet utilization. The improvements in vehicle fleet utilization can decrease supply chain costs and allow for improved profitability and/or reduced costs to the customer.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:
1. A system comprising:
a processor; and
a non-transitory memory storing instructions that, when executed, cause the processor to:
obtain, in accordance with an identification of a respective customer in a plurality of customers, (i) customer order data characterizing one or more interactions by the respective customer through at least one computing device in electronic communication with an electronic marketplace, the one or more interactions comprising one or more delivery time windows selected by the customer and (ii) environmental data characterizing two or more external factors configured to generate an interaction by the respective customer, through the at least one computing device, with the electronic marketplace, the two or more external factors comprising a local external factor and a global external factor;
cluster each of the plurality of customers into one of a plurality of clusters based on corresponding historical customer order data and historical environmental data;
apply the historical customer order data and the historical environmental data as input to a feature generator and, in response, generate feature data, the feature data organizing the historical customer order data and the historical environmental data based on input characteristics of an order size estimation model;
train the order size estimation model by applying the feature data and the environmental data generated for a cluster of the plurality of clusters for the respective customer as input to the order size estimation model and, in response, generate a trained order size estimation model comprising one or more parameters configured to characterize a plurality of relationships between inputted feature data and outputted prediction order size data;

apply the customer order data to the trained order size estimation model and, in response, generate prediction data characterizing a prediction of an order size, wherein the trained order size estimation model implements a custom loss function to generate the prediction data;

determine a performance of the trained order size estimation model based on applying a plurality of key performance indicators (KPIs) to the prediction data;

generate an updated order size estimation model based on an update of the one or more parameters of the trained order size estimation model, the update of the one or more parameters based, at least in part, on the performance of the trained order size estimation model;

compare the performance of the trained order size estimation model against a performance of the updated order size estimation model;

determine that the comparison satisfies a threshold performance and, in response, determine, using the updated order size estimation model, a predicted order size, wherein the updated order size estimation model applies an actual customer order size against a set of weights determined based on a proximity in time to a cut-off time for a delivery window to the respective customer to determine the predicted order size;

determine an expected utilization of a vehicle fleet including the predicted order size based on the predicted order size and capacity data for the vehicle fleet;

adjust a delivery availability of the electronic marketplace based on the expected utilization;

communicate one or more display instructions to display the adjusted delivery availability to the respective customer via the at least one computing device;

obtain a selection of the delivery window based on the displayed adjusted delivery availability, wherein the selection of the delivery window is for one or more products in a virtual cart of the electronic marketplace for the respective customer; and in response to obtaining the selection of the delivery window, communicate the predicted order size for fulfillment of the one or more products in the virtual cart and delivery during the delivery window.

2. The system of claim 1, wherein the order size estimation model is a time series regression model.

3. The system of claim 1, wherein the customer order data comprises historical order data and current order data, the historical order data characterizing the customer's changes to the customer order data prior to the cut-off time for the delivery time window and the current order data characterizing the customer's actual order on the electronic marketplace.

4. The system of claim 1, wherein the instructions cause the processor to determine the expected utilization at predetermined time intervals prior to the cut-off time for the delivery time window.

5. The system of claim 1, wherein the instructions cause the processor to identify the customer into one of a plurality of customer groups, the plurality of customer groups characterizing customers' activity on the electronic marketplace.

6. The system of claim 1, wherein the generation of feature data comprises organizing the customer order data into one or more categories based on a predetermined taxonomy of the electronic marketplace.

7. The system of claim 1, wherein the adjustment of delivery availability comprises opening available delivery slots in the electronic marketplace when the predicted order size is less than a previously determined predicted order size.

8. The system of claim 1, wherein the instructions cause the processor to communicate the one or more display instructions prior to lapse of the delivery time window.

9. The system of claim 1, wherein the feature generator structures the customer order data and the environmental data from a first data format to a second data format different than the first data format in order to provide the feature data in the second data format.

10. The system of claim 1, wherein the predicted order size comprises a predicted mass, a predicted volume, a predicted quantity, or a combination thereof.

11. The system of claim 1, wherein the instructions cause the processor to adjust the set of weights based on the two or more external factors and the customer order data.

12. The system of claim 1, wherein the set of weights are defined, at least in part, by a user different than the customer.

13. The system of claim 1, wherein the delivery availability comprises information allowing the customer to add a first object to a first order associated with the customer.

14. The system of claim 1, wherein the expected utilizations comprises a first portion associated with a maximum vehicle capacity utilization associated with a first plurality of vehicles and a second portion associated with an excess capacity utilization of the first plurality of vehicles.

15. The system of claim 1, wherein the instructions cause the processor to determine the predicted order size on a semi-continuous or periodic basis.

16. The system of claim 1, wherein the predicted order size comprises a weighted average of both a current mass, a current volume, a current quantity, or a combination thereof, and a predicted mass, a predicted volume, a predicted quantity, or a combination thereof different from the current mass, the current volume, the current quantity, or the combination thereof.

17. The system of claim 1, wherein the instructions cause the processor to update one or more parameters of the updated order size estimation model based, at least in part, on a performance of the delivery availability to obtain a revised order size estimation model, compare the performance of the updated order size estimation model against a performance of the revised order size estimation model, and determine, in accordance with a determination that the comparison satisfies the threshold performance, using the revised order size estimation model, another predicted order size.

18. The system of claim 1, wherein the instructions cause the processor to perform the obtaining to the communicating in real-time.

19. A method comprising:

obtaining, in accordance with an identification of a respective customer in a plurality of customers, (i) customer order data characterizing one or more interactions by the respective customer through at least one computing device in electronic communication with an electronic marketplace, the one or more interactions comprising one or more delivery time windows selected by the customer and (ii) environmental data characterizing two or more external factors configured to generate an interaction by the respective customer, through the at least one computing device, with the electronic marketplace, the two or more external factors comprising a local external factor and a global external factor;

clustering each of the plurality of customers into one of a plurality of clusters based on corresponding historical customer order data and historical environmental data;

applying the historical customer order data and the historical environmental data as input to a feature generator and, in response, generating feature data, the feature data organizing the historical customer order data and the historical environmental data based on input characteristics of an order size estimation model;

training the order size estimation model by applying the feature data and the environmental data generated for a cluster of the plurality of clusters for the respective customer as input to the order size estimation model and, in response, generating a trained order size estimation model comprising one or more parameters configured to characterize a plurality of relationships between inputted feature data and outputted prediction order size data;

applying the customer order data to the trained order size estimation model and, in response, generating prediction data characterizing a prediction of an order size, wherein the trained order size estimation model implements a custom loss function to generate the prediction data;

determining a performance of the trained order size estimation model based on applying a plurality of key performance indicators (KPIs) to the prediction data;

generating an updated order size estimation model based on updating the one or more parameters of the trained order size estimation model, the updating based, at least in part, on the performance of the trained order size estimation model;

comparing the performance of the trained order size estimation model against a performance of the updated order size estimation model;

determining that the comparison satisfies a threshold performance and, in response, determining, using the updated order size estimation model, a predicted order size, wherein the updated order size estimation model applies an actual customer order size against a set of weights determined based on a proximity in time to a cut-off time for a delivery window to the respective customer to determine the predicted order size;

determining an expected utilization of a vehicle fleet including the predicted order size based on the predicted order size and capacity data for the vehicle fleet;

adjusting a delivery availability of the electronic marketplace based on the expected utilization; and communicating one or more display instructions to display the adjusted delivery availability to the respective customer via the at least one computing device;

obtaining a selection of the delivery window based on the displayed adjusted delivery availability, wherein the selection of the delivery window is for one or more products in a virtual cart of the electronic marketplace for the respective customer; and in response to obtaining the selection of the delivery window, communicating the predicted order size for fulfillment of the one or more products in the virtual cart and delivery during the delivery window.

20. A non-transitory computer readable medium having instructions stored thereon, wherein the instructions, when executed by at least one processor, cause a device to perform operations comprising:

obtaining, in accordance with an identification of a respective customer in a plurality of customers, (i) customer order data characterizing one or more interactions by the respective customer through at least one computing device in electronic communication with an electronic marketplace, the one or more interactions comprising one or more delivery time windows selected by the customer and (ii) environmental data characterizing two or more external factors configured to generate an interaction by the respective customer, through the at least one computing device, with the electronic marketplace, the two or more external factors comprising a local external factor and a global external factor;

clustering each of the plurality of customers into one of a plurality of clusters based on corresponding historical customer order data and historical environmental data;

applying the historical customer order data and the historical environmental data as input to a feature generator and, in response, generating feature data, the feature data organizing the historical customer order data and the historical environmental data based on input characteristics of an order size estimation model;

training the order size estimation model by applying the feature data and the environmental data generated for a cluster of the plurality of clusters for the respective customer as input to the order size estimation model and, in response, generating a trained order size estimation model comprising one or more parameters configured to characterize a plurality of relationships between inputted feature data and outputted prediction order size data;

applying the customer order data to the trained order size estimation model and, in response, generate prediction data characterizing a prediction of an order size, wherein the trained order size estimation model implements a custom loss function to generate the prediction data;

determining a performance of the trained order size estimation model based on applying a plurality of key performance indicators (KPIs) to the prediction data;

generating an updated order size estimation model based on an update of the one or more parameters of the trained order size estimation model, the update of the one or more parameters based, at least in part, on the performance of the trained order size estimation model;

comparing the performance of the trained order size estimation model against a performance of the updated order size estimation model;

determining that the comparison satisfies a threshold performance and, in response determining, using the updated order size estimation model, a predicted order size, wherein updated the order size estimation model applies an actual customer order size against a set of weights determined based on a proximity in time to a cut-off time for a delivery window to the respective customer to determine the predicted order size;

determining an expected utilization of a vehicle fleet including the predicted order size based on the predicted order size and capacity data for the vehicle fleet;

adjusting a delivery availability of the electronic marketplace based on the expected utilization;

communicating one or more display instructions to display the adjusted delivery availability to the respective customer via the at least one computing device;

obtaining a selection of the delivery window based on the displayed adjusted delivery availability, wherein the selection of the delivery window is for one or more products in a virtual cart of the electronic marketplace for the respective customer; and in response to obtaining the selection of the delivery window, communicating the predicted order size for fulfillment of the one or more products in the virtual cart and delivery during the delivery window.

\* \* \* \* \*